United States Patent [19]
Johnson

[11] 3,709,086
[45] Jan. 9, 1973

[54] HIGH STRENGTH ADJUSTABLE QUARTER TURN FASTENER

[75] Inventor: Norman S. Johnson, Milford, N.J.
[73] Assignee: Rex Chainbelt Inc., Milwaukee, Wis.
[22] Filed: Dec. 29, 1969
[21] Appl. No.: 1,934

Related U.S. Application Data

[62] Division of Ser. No. 774,079, Nov. 7, 1968, Pat. No. 3,554,075.

[52] U.S. Cl. ................................85/7, 24/221 A
[51] Int. Cl. .........................F16b 19/00, F16b 21/02
[58] Field of Search............85/7, 5.2, 5, 1; 24/221 A, 24/221 K, 221 R; 151/69, 6, 41.7; 287/189.36 F

[56] References Cited

UNITED STATES PATENTS

| | | | |
|---|---|---|---|
| 2,329,909 | 9/1943 | Johnson | 24/221 A |
| 3,289,525 | 12/1966 | Lee | 85/81 |
| 2,922,456 | 1/1960 | Kann | 151/69 |
| 2,204,116 | 6/1940 | Blocher | 85/7 |
| 2,378,638 | 6/1945 | Johnson | 24/221 A |
| 2,560,519 | 7/1951 | Bedford | 24/221 A |

Primary Examiner—Ramon S. Britts
Attorney—Shenier and O'Connor

[57] ABSTRACT

A quarter turn fastener assembly for joining two members in assembled relationship in which one of the members rotatably supports a hollow shaft having a head on one side thereof and having diametrically oppositely located, axially extended wall slots which receive a cross pin at the other side of the member for sliding movement in the direction of the axis of the shaft. Adjustable means limits movement of the cross pin in a direction away from the head to adjust the force with which the two members are drawn together when the fastener is operated. The side of the other member remote from the first member carries a receptacle having a central opening and diametrically oppositely extending slots and having generally circularly arranged cam tracks leading to level portions onto which the cross pin rides behind resilient locking detents in response to rotation of the shaft.

3 Claims, 9 Drawing Figures

INVENTOR
Norman S. Johnson
BY
Shanier & O'Connor
ATTORNEYS

PATENTED JAN 9 1973
3,709,086
SHEET 2 OF 2
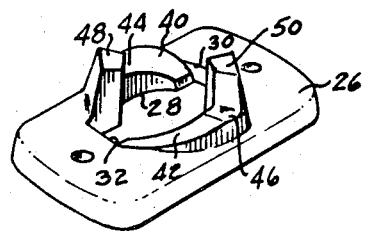
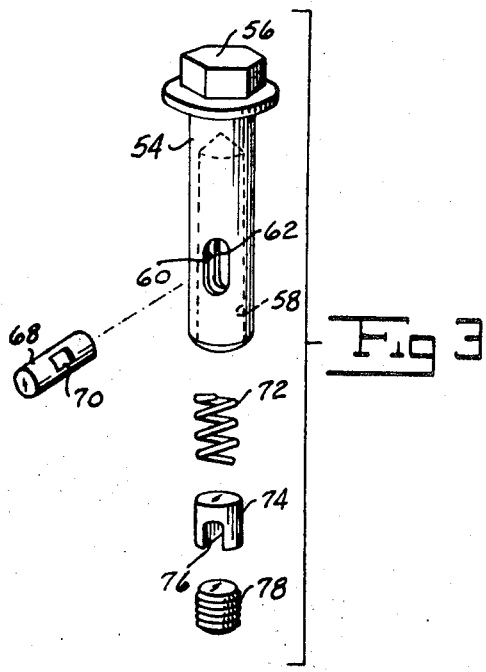
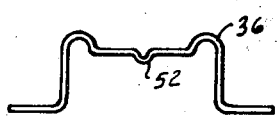
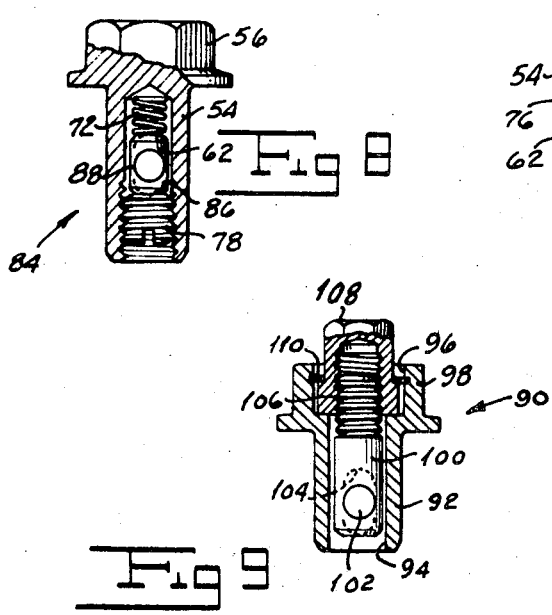
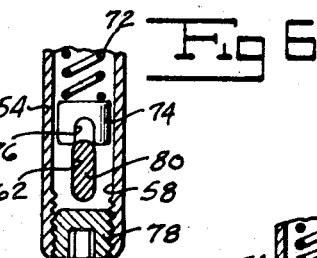
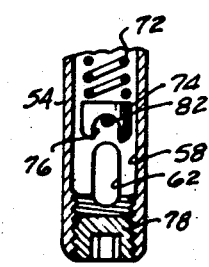
INVENTOR
*Norman S. Johnson*
BY
*Shenier & O'Connor*
ATTORNEYS 3,709,086

HIGH STRENGTH ADJUSTABLE QUARTER TURN FASTENER

This application is a division of my copending application Ser. No. 774,079 filed Nov. 7, 1968 now U.S. Pat. No. 3,554,075.

BACKGROUND OF THE INVENTION

One fastener which is widely used in the prior art is the quarter turn fastener. In such a fastener assembly one of the two members to be joined rotatably supports a shaft having a head at one end and having a cross pin adjacent its other end. The other of the two members to be joined carries a receptacle formed with an opening registering with an opening in the other member to permit passage of the shaft and cross pin therethrough in one position of the shaft around its axis of rotation. From that entry position the shaft can be rotated to cause the ends of the cross pin to ride up respective cam tracks to draw the members together and finally to ride into recesses at the ends of the track to prevent the cross pin ends from slipping back down the tracks.

In the simplest form of quarter turn fastener of the type described above, as the fastener is operated the head is drawn up against the member carrying the shaft and the clamping force is provided by tension in the shaft. This type of quarter turn fastener involves a number of defects. It will not accommodate any range of panel thicknesses. It is not readily disassembled. The clamping force provided by the fastener is not readily adjusted.

In a variation of quarter turn fastener which has been proposed in the prior art a spring is provided to urge the shaft in such an axial direction as to draw the cross pin toward the receptacle track. While this form of fastener is in some respects an improvement over the simplest form of quarter turn fastener, it too incorporates a number of defects. While it accommodates a limited range of panel thicknesses, the force with which the members are drawn together is uncertain. Moreover, like the simplest form of quarter turn fastener, it is not readily applied to and removed from a panel without the provision of extra retaining washers and the like. In addition, the slacking off of the load or clamping force as the ends of the cross pin ride into the locking recesses may result in accidental unlocking of the fastener under the influence of vibration or the like.

I have invented a high strength adjustable quarter turn fastener which overcomes the defects of quarter turn fasteners of the prior art. My fastener is infinitely adjustable and yet permits rapid locking and unlocking action. My fastener permits adjustment of the lock-up load over a wide range of clamping forces. My quarter turn fastener is strong and rugged. It is easy to install and replace and yet does not require auxiliary mounting elements to accomplish this result. My fastener provides a positive lock in its operative position and is not readily unlocked under the influence of vibration.

SUMMARY OF THE INVENTION

One object of my invention is to provide a high strength adjustable quarter turn fastener which overcomes the defects of quarter turn fasteners of the prior art.

Another object of my invention is to provide a high strength adjustable quarter turn fastener which is infinitely adjustable and yet which is able to be quickly locked and quickly unlocked.

A further object of my invention is to provide a high strength adjustable quarter turn fastener which is easily installed and replaced without the necessity of auxiliary mounting elements.

A still further object of my invention is to provide a high strength adjustable quarter turn fastener in which the lock-up load can be adjusted over a wide range of clamping forces.

Yet another object of my invention is to provide a high strength adjustable quarter turn fastener having a positive lock without slacking off the lock-up load.

Other and further objects of my invention will appear from the following description.

In general, my invention contemplates the provision of a high strength adjustable quarter turn fastener for clamping two members in assembled relationship with a predetermined clamping force in which one of the two members rotatably supports a shaft having a head at one end and having a cross pin slidably mounted on the shaft for movement in the direction of the longitudinal axis of the shaft. Resilient means normally urges the cross pin away from the head and an adjustable stop carried by the shaft limits that movement. The other member to be joined carries a receptacle assembly comprising a central opening having diametrically oppositely extending slots which permit passage of the cross pin therethrough to positions at which the ends thereof may ride up cam tracks leading from the slots and beyond resilient locking detents to flat portions adjacent stops as the shaft rotates.

BRIEF DESCRIPTION OF THE DRAWINGS

In the accompanying drawings which form part of the instant specification and which are to be read in conjunction therewith and in which like reference numerals are used to indicate like parts in the various views:

FIG. 3 is an exploded view of the shaft and cross pin assembly of my high strength adjustable quarter turn fastener.

FIG. 4 is a perspective view of the cam member of the receptacle assembly of my high strength adjustable quarter turn fastener.

FIG. 5 is a side elevation of the detent clip of the receptacle assembly of my high strength adjustable quarter turn fastener.

FIG. 6 is a fragmentary sectional view of one form of shaft assembly of my high strength adjustable quarter turn fastener before its application to a panel or the like.

FIG. 7 is a fragmentary sectional view of an alternate form of shaft assembly of my high strength adjustable quarter turn fastener before its application to a mounting member.

FIG. 8 is a sectional view of a further form of shaft and cross pin assembly of my high strength adjustable quarter turn fastener.

FIG. 9 is a sectional view of yet another form of shaft assembly of my high strength adjustable quarter turn fastener.

DESCRIPTION OF THE PREFERRED EMBODIMENT

Figure 1:
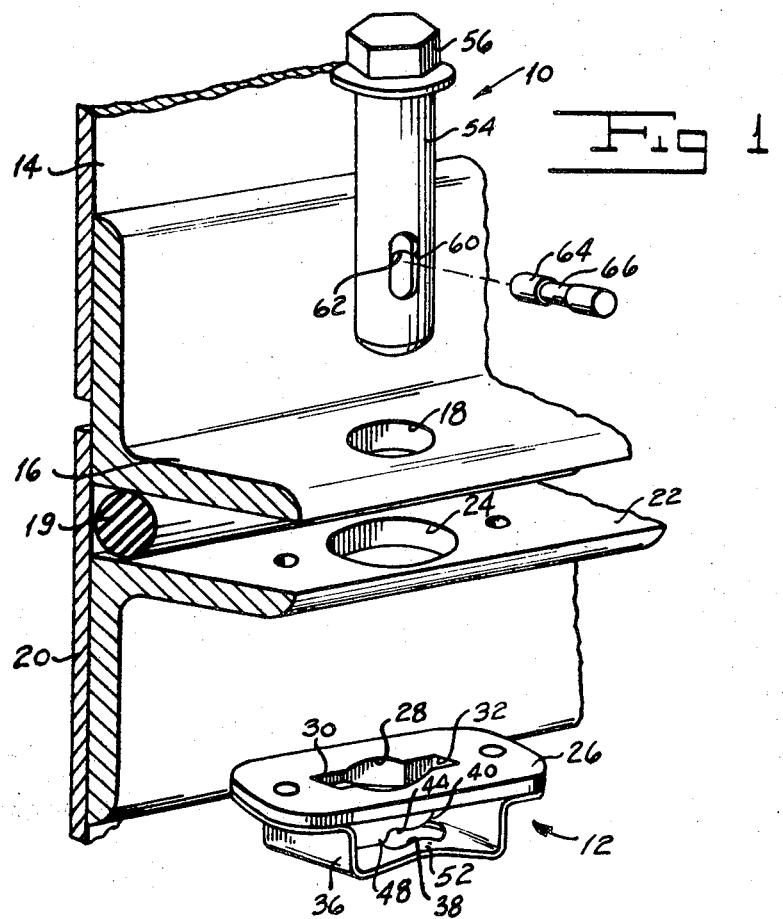
FIG. 1 is a perspective view of my high strength adjustable quarter turn fastener illustrating the parts thereof before they have been applied to the members to be joined.
Figure 2:
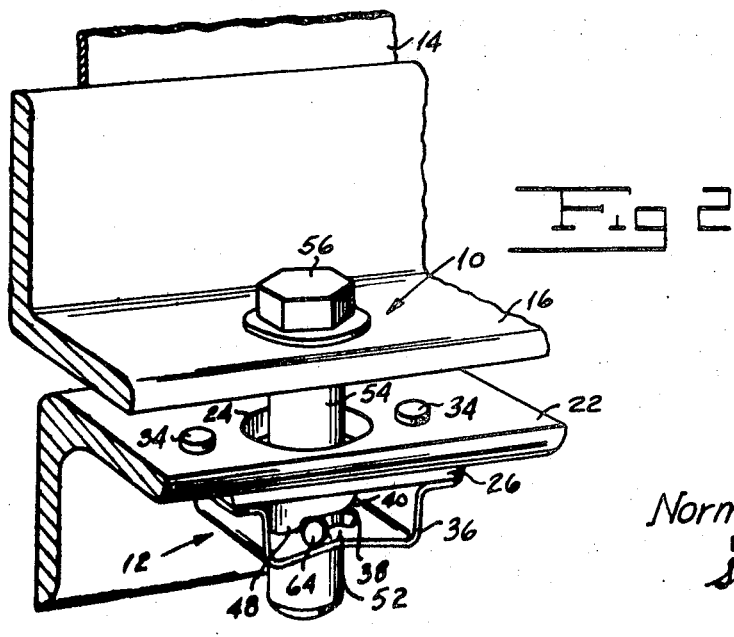
FIG. 2 is a perspective view of my high strength adjustable quarter turn fastener illustrating the parts after they have been mounted on the members to be joined.

Referring now to FIGS. 1 to 5 of the drawings, my high strength adjustable quarter turn fastener includes a shaft and cross pin assembly, indicated generally by the reference character 10, and a receptacle assembly indicated generally by the reference character 12. In one use of my fastener, it may join a first member 14, which may be half of a container or the like, to a second member 20 which may be the other half of the container. The member 14 carries a parting rail 16 having an opening 18 while the member 20 is provided with a parting rail 22 having an opening 24 which is adapted to register with opening 18 when the two members are joined. The container or the like may be provided with resilient means such as a gasket 19 disposed between the flanges and adapted to have a clamping force exerted thereon when the two members are drawn together in a manner to be described or any other resilient means against which the fastener acts.

The receptacle assembly 12 includes a cam member having a base 26 provided with an opening 28 having diametrically oppositely extending slots 30 and 32 to permit the cross pin, to be described hereinafter, to enter the receptacle. Any suitable means such, for example, as rivets 34 may be employed to secure the receptacle assembly 12 to the rail 22 at a location at which opening 28 registers with opening 24. These rivets 34 also hold a detent clip 36 in position on the base 26. I provide the clip 36 with a central opening 38 which registers with the opening 28. The underside of the base 26 is provided with respective generally circularly arranged cam tracks 40 and 42 which lead upwardly from the undersurface of base 26 adjacent the edges of the slots 30 and 32 to level portions or flats 44 and 46 adjacent stops 48 and 50. These level portions or flats 44 and 46 are generally parallel to base 26. The clip 36 is provided with respective spring detents 52 positioned generally over the points at which the respective cam tracks 40 and 42 lead into flats 44 and 46.

The shaft and cross pin assembly 10 includes the shaft 54 having a head 56 which may conveniently be formed with a hexagonal cross-sectional shape to permit it to receive a tool such as a wrench or the like (not shown). I provide the shaft 54 with a bore 58 extending from the end of the shaft remote head 56 toward the head. I form respective generally diametrically oppositely located, axially extending slots 60 and 62 in the wall of the shaft 54. Slots 60 and 62 are adapted to receive the cross pin of my assembly. In one form of the cross pin 64 illustrated in FIG. 1, it may be provided with a reduced diameter central portion 66. In another form of cross pin 68 illustrated in FIG. 3 it may be provided with diametrically oppositely located flats 70. It is to be understood that the diameter of opening 18 in the rail 16 normally is only slightly larger than is the diameter of the shaft 54. Thus the shaft 54 must be inserted through opening 18 before the cross pin 64 or 68 is applied to the shaft.

The completed cross pin and shaft assembly 10 includes a coil spring 72, a cross pin receiving and positioning plunger 74 having a slot 76 therein and an adjusting screw 78. With all the parts in position, the slot 76 receives either the reduced central portion 66 of the pin 64 or the flats 70 of the pin 68 with the ends of the pin extending outwardly through slots 60 and 62. Spring 72 is located in the bore 58 above the guide 74 while the adjusting screw 78 is threaded into the open end of the bore. Under these conditions spring 72 urges the pin receiving guide 74 downwardly until the guide engages the upper end of screw 78, thus to position the cross pin along the length of the slots 60 and 62. It will readily be understood that screw 78 can be moved into or out of the bore to adjust the position of the cross pin within the limits of adjustment afforded by slots 60 and 62. Thus a range of thicknesses of members 16 and 22 can be accommodated. This feature further permits adjustment of the clamping force of the fastener.

I provide the shaft and cross pin assembly 10 with means for facilitating the operation of assembling the cross pin in slots 60 and 62 of the shaft 54. Referring to FIG. 6 in one form of the device before the cross pin has been assembled in the shaft slots, a slug 80 is positioned in the slots with the cross pin-receiving plunger 74 resting on the top of the slug. With this form of my fastener shaft 54 can be inserted through opening 18 until the slug 80 is exposed at the underside of the parting rail 16. With the parts in this position, the cross pin 64 or 68 can be pushed against the slug 80 so as to drive the slug out of the slots 60 and 62 as the cross pin moves through the slots. The pin is then worked into such a position that the plunger recess 76 rides over the reduced portion 66 of the pin 64 or over the flats 70 of pin 68.

Referring to FIG. 7, in another form of my fastener a small pin 82 passing through openings in the walls engages in the recess 76 of the plunger 74 releasably to hold the plunger in a position above openings 60 and 62. In this form of my fastener the shaft 54 is inserted through the hole 18 until pin 82 is accessible below the hole. The cross pin 64 or 68 is inserted through the openings and the pin 82 is driven out to release the plunger to permit recess 76 to engage either the reduced portion 66 of pin 64 or the flats 70 of pin 68.

Referring now to FIG. 8, I have shown an alternate form of shaft and cross pin assembly, indicated generally by the reference character 84, which while being adjustable does not have the ready assembly and disassembly feature of the forms of my fastener heretofore described. The shaft and cross pin assembly 84 includes the shaft 54 having the head 56 and the wall openings 60 and 62 with only the opening 62 being shown in the Figure. In this assembly a guide element 86 disposed in the bore 58 carries a cross pin 88, the ends of which extend outwardly through the slots 60 and 62. The coil spring 72 urges element 86 downwardly as viewed in FIG. 8 until it comes to rest against the adjusting screw 78.

Referring now to FIG. 9, in a further form of shaft and cross pin assembly, indicated generally by the reference character 90, a shaft 92 has a central bore 94 leading from the lower end of the shaft to a recess 96 in a hollow head 98 on the shaft. A stud 100 disposed in the bore 94 carries a cross pin 102, the ends of which extend outwardly through shaft wall slots 104, one of which is shown in FIG. 9. Stud 100 has a threaded portion 106 which receives a nut 108 rotatably retained in recess 96 by a snap ring 110. It will readily be appreciated that the nut 108 can be turned to position stud 100 and thus the cross pin along the length of slots 104.

In use of the form of my fastener illustrated in FIGS. 1 to 5, the receptacle assembly 12 first is mounted on rail 22 by any suitable means, such as by rivets or the like, with the opening 24 aligned with opening 28. It will be appreciated that the diameter of opening 24 and the distance between the ends of the slots 30 and 32 is sufficient to permit entry of the cross pin 64 or 68 into the receptacle. In order to mount the shaft and cross pin assembly on rail 16, the shaft without the cross pin first is inserted through opening 18 until the slots 60 and 62 are positioned behind the opening. Next the cross pin 64 or 68 is inserted through the slots between the plunger 74 and the adjusting screw 78. This operation may be facilitated by use either of the slug 80 or the pin 82 releasably to hold the plunger out of engagement with the cross pin until after the cross pin has been inserted in the slots. It will be further understood that the adjusting screw 78 may be actuated to adjust the position of the cross pin 64 or 68 along the lengths of the slots so as to afford the desired clamping force. This may be done either before the cross pin has been assembled on the the shaft or after the cross pin has been assembled on the shaft.

Once the shaft and cross pin assembly has been mounted on the rail 16 and the receptacle assembly 12 has been mounted on the rail 22, the fastener is ready for operation. In operation thereof, the rails 16 and 22 are positioned adjacent each other and the shaft is rotated until the cross pin is aligned with slots 30 and 32. The shaft then is moved axially to move the cross pin into the receptacle to a position at which its ends are adjacent the beginnings of cams 40 and 42. Next shaft 54 is rotated and the ends of the cross pin ride by the cams to draw the rails 16 and 22 together. Finally the cross pin ends ride onto the flats 44 and 46 and against the stops 48 and 50. In the course of so doing they ride under the spring detents 52 which snap into place behind the cross pin ends to lock the fastener. It will be appreciated that the shaft and cross pin assembly can be adjusted at any time in the course of use of the fastener. Moreover, the shaft and cross pin assembly may be removed and replaced at any time.

In use of either of the forms of shaft and cross pin assembly shown in FIGS. 8 and 9, the effective position of the cross pin along the length of the pairs of shaft wall slots is readily adjusted. In the form shown in FIG. 8 this is achieved by moving the adjusting screw 78 in or out of the bore 58. In the form shown in FIG. 9, nut 108 is turned to achieve this result.

It will be seen that I have accomplished the objects of my invention. I have provided a high strength adjustable quarter turn fastener. My fastener is infinitely adjustable and yet provides a rapid locking and unlocking action. I may readily adjust the lock-up load over a wide range of clamping forces. My fastener is provided with a positive lock without any slacking off of the clamping load. My fastener is easily installed and may readily be replaced.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a fastener adapted for use in an installation having a member with an accessible side and a relatively inaccessible side and a fastener-receiving hole extending between said sides, an assembly including in combination, a shaft adapted to be inserted into said hole, a cross pin, means mounting said cross pin on said shaft perpendicularly thereto and for sliding movement longitudinally thereof at said inaccessible side and means for adjustably positioning said pin along said shaft, said shaft being formed with a head at one end, said head being enlarged with respect to said shaft for engaging said accessible side around said hole when said shaft is inserted into said hole, said shaft being formed with a bore extending from the other end toward said head, said head being formed with an open recess leading into said bore, said positioning means comprising a stud in said bore and extending into said recess, said stud carrying said cross pin, a nut supported in said recess for rotary movement while being restrained against axial movement and interengageable threads on the portion of said stud extending into said recess and on said nut for moving said stud axially to position said cross pin in response to rotary movement of said nut.

2. An assembly as in claim 1 in which said shaft is formed with axially elongated slots in the wall of said bore, said crosspin extending through said slots.

3. An assembly as in claim 1 in which said nut is formed with an external shoulder intermediate its ends, in which said open recess freely admits said nut, and in which said assembly includes a snap ring in said recess in engagement with said shoulder for retaining said nut in said recess.

* * * * *